(12) United States Patent
Andrios

(10) Patent No.: US 10,159,191 B2
(45) Date of Patent: Dec. 25, 2018

(54) HARVESTER GRAIN UNLOADER

(71) Applicant: Deere and Company, Moline, IL (US)

(72) Inventor: John C. Andrios, Geneseo, IL (US)

(73) Assignee: Deere & Company, Moline, IL (US)

( * ) Notice: Subject to any disclaimer, the term of this patent is extended or adjusted under 35 U.S.C. 154(b) by 104 days.

(21) Appl. No.: 15/273,771

(22) Filed: Sep. 23, 2016

(65) Prior Publication Data

US 2018/0084727 A1 Mar. 29, 2018

(51) Int. Cl.
*A01D 90/10* (2006.01)
*A01D 41/12* (2006.01)
*A01D 41/127* (2006.01)
*A01F 12/18* (2006.01)
*A01F 12/46* (2006.01)

(52) U.S. Cl.
CPC .......... *A01D 90/10* (2013.01); *A01D 41/127* (2013.01); *A01D 41/1217* (2013.01); *A01D 41/1274* (2013.01); *A01F 12/18* (2013.01); *A01F 12/46* (2013.01)

(58) Field of Classification Search
CPC ............. A01D 43/073; A01D 43/087; A01D 41/1217; A01D 75/187; A01D 34/008; A01D 69/06; A01D 90/12; A01D 90/10; A01D 46/00; A01D 43/10; A01D 45/02; A01D 75/02
USPC ........................................................ 701/50
See application file for complete search history.

(56) References Cited

U.S. PATENT DOCUMENTS

| | | | | |
|---|---|---|---|---|
| 2,710,231 A | * | 6/1955 | Dulmage | F04D 23/003 406/101 |
| 2,771,203 A | * | 11/1956 | Collins | A01D 90/10 198/607 |
| 3,152,702 A | * | 10/1964 | Klemm | A01D 41/1208 198/602 |
| 3,304,698 A | * | 2/1967 | Herbsthofer | A01D 41/04 56/15.1 |
| 4,376,609 A | | 3/1983 | Bohman et al. | |
| 4,524,572 A | * | 6/1985 | Wilde | A01D 45/008 171/28 |
| 4,821,495 A | * | 4/1989 | De Buhr | A01D 43/086 406/100 |
| 5,259,858 A | * | 11/1993 | Inao | C03B 23/002 65/102 |
| 5,323,594 A | * | 6/1994 | Whitney | A01D 45/30 56/126 |
| 5,575,316 A | * | 11/1996 | Pollklas | A01D 43/073 141/198 |

(Continued)

FOREIGN PATENT DOCUMENTS

| | | |
|---|---|---|
| DE | 2658820 | 6/1978 |
| EP | 2732688 | 5/2014 |
| WO | WO2016077686 | 5/2016 |

OTHER PUBLICATIONS

EP search report for 17191342.9 dated Feb. 26, 2018.

*Primary Examiner* — Courtney D Heinle
*Assistant Examiner* — Luis A Martinez Borrero
(74) *Attorney, Agent, or Firm* — Rathe Lindenbaum LLP

(57) ABSTRACT

A harvester grain unloading auger may have auger flights within an unloader housing, wherein a discharge speed adjustment mechanism is coupled to the unloader housing to receive grain from the grain unloading auger at a first speed. The discharge speed adjustment mechanism discharges the grain at a second speed greater than the first speed.

20 Claims, 12 Drawing Sheets

(56) References Cited

U.S. PATENT DOCUMENTS

| | | | |
|---|---|---|---|
| 6,125,618 A | 10/2000 | Dillon | |
| 6,460,008 B1 * | 10/2002 | Hardt | A01D 41/1272 460/1 |
| 6,943,824 B2 * | 9/2005 | Alexia | A01D 43/073 348/120 |
| 8,126,620 B2 * | 2/2012 | Ringwald | A01B 69/008 141/192 |
| 8,180,534 B2 * | 5/2012 | Burke | A01D 41/1217 701/50 |
| 8,241,098 B1 | 8/2012 | Latimer | |
| 8,396,632 B2 * | 3/2013 | Burke | A01D 41/1217 701/50 |
| 8,840,357 B2 * | 9/2014 | Anderson | A01D 90/02 414/345 |
| 9,119,342 B2 * | 9/2015 | Bonefas | A01D 34/001 |
| 9,756,786 B2 * | 9/2017 | Heitmann | A01D 41/1273 |
| 9,826,683 B2 * | 11/2017 | Bruns | A01B 76/00 |
| 2002/0083695 A1 * | 7/2002 | Behnke | A01B 69/008 56/119 |
| 2004/0173435 A1 * | 9/2004 | Vogelgesang | A01D 43/087 198/317 |
| 2008/0245042 A1 * | 10/2008 | Brunnert | A01D 43/087 56/10.2 F |
| 2010/0070144 A1 | 3/2010 | Burke et al. | |
| 2010/0193411 A1 * | 8/2010 | Redekop | A01D 90/02 209/509 |
| 2010/0202864 A1 * | 8/2010 | Geraets | A01D 87/10 414/526 |
| 2010/0266377 A1 * | 10/2010 | Yoder | A01D 41/1217 414/519 |
| 2010/0274452 A1 * | 10/2010 | Ringwald | A01B 69/008 701/50 |
| 2011/0209925 A1 * | 9/2011 | Rossi | G01G 11/003 177/145 |
| 2012/0269607 A1 * | 10/2012 | Farley | B65G 33/14 414/507 |
| 2012/0316737 A1 * | 12/2012 | Missotten | A01D 41/1217 701/50 |
| 2013/0089398 A1 * | 4/2013 | Farley | A01D 41/127 414/526 |
| 2013/0211675 A1 * | 8/2013 | Bonefas | B62D 12/02 701/41 |
| 2014/0059988 A1 * | 3/2014 | Diekhans | A01D 43/085 56/10.2 A |
| 2014/0113694 A1 * | 4/2014 | Coppinger | A01D 41/1217 460/114 |
| 2014/0113894 A1 | 4/2014 | Coppinger | |
| 2014/0311113 A1 * | 10/2014 | Bonefas | A01D 34/001 56/10.2 R |
| 2015/0027854 A1 * | 1/2015 | Priepke | B65G 15/08 198/617 |
| 2016/0057927 A1 | 3/2016 | Bojsen et al. | |
| 2016/0174465 A1 * | 6/2016 | Kohls | A01D 41/1217 414/518 |
| 2017/0055446 A1 * | 3/2017 | Nykamp | A01D 43/073 |
| 2017/0118914 A1 * | 5/2017 | Bruns | A01B 76/00 |
| 2017/0142899 A1 * | 5/2017 | Matousek | B65G 33/26 |

* cited by examiner

HARVESTER GRAIN UNLOADER

BACKGROUND

Harvesters are used to harvest crop from a field. The harvested crop is unloaded to a truck, wagon, grain cart or other type of grain carrier. Fully loading the grain carrier is often challenging, consuming the attention of the operator. The task of more fully filling the grain carrier may be even more challenging when such unloading of the harvester occurs while the harvester is moving across the field.

DETAILED DESCRIPTION OF EXAMPLES

Figure 1:
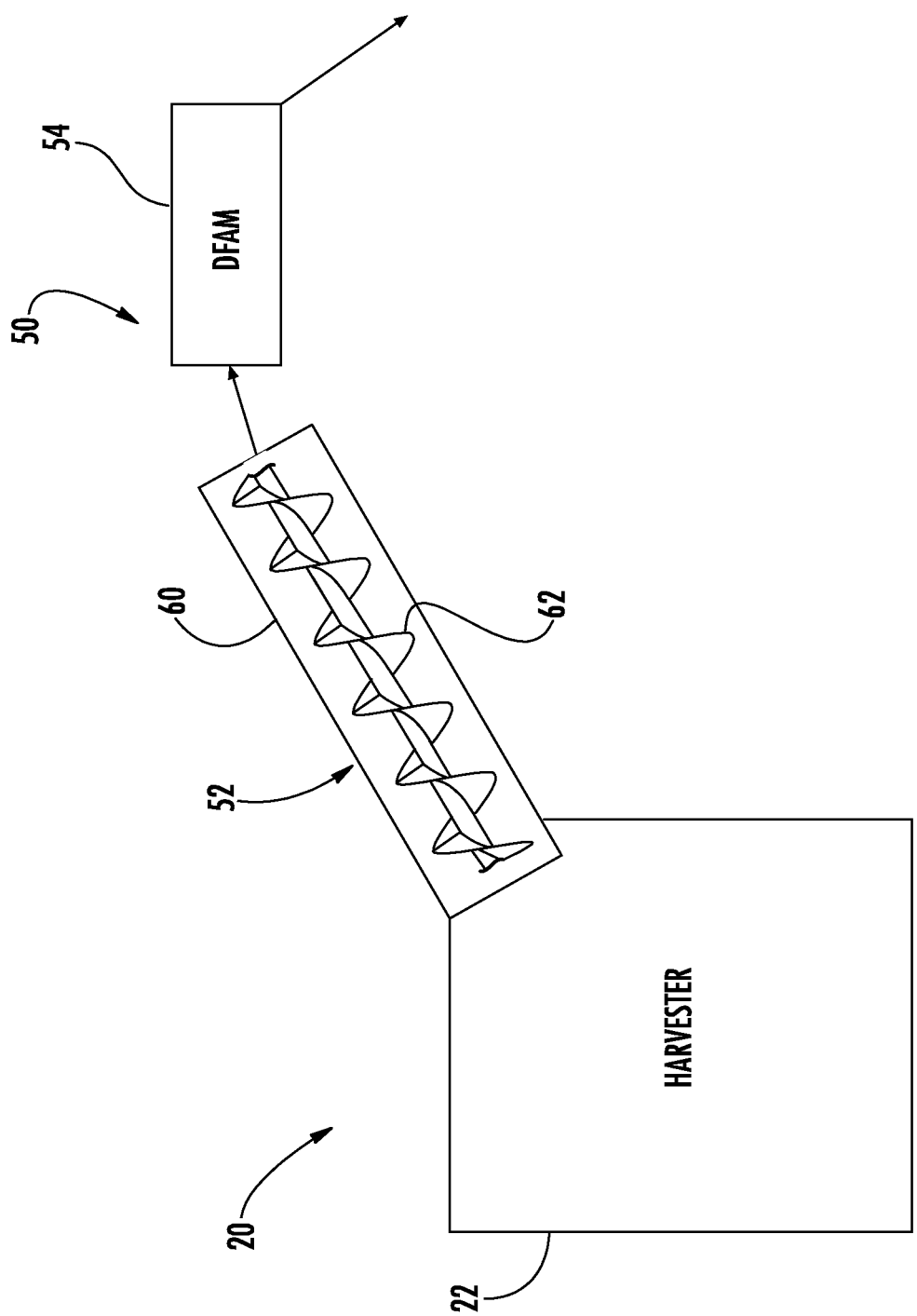
FIG. 1 is a schematic diagram illustrating an example harvesting and grain unloading system having an example grain unloader.

FIG. 1 schematically illustrates an example harvesting and grain unloading system 20. As will be described hereafter, harvesting and grain unloading system 20 adjusts the speed of the grain being unloaded or discharged at or proximate the point at which the grain leaves system 20 to facilitate greater control over the filling of a grain carrier. Throughout the disclosure, the term "speed" is a scaler quantity, units of distance divided by time. The term "velocity" refers to speed with direction, a vector. It should be appreciated that in some implementations, velocity measurements and adjustments may be made instead of simple "speed" measurements and adjustments. In each of the following described implementations where speed is sensed and/or where speed adjustments are made, such measurements and adjustments may alternatively comprise velocity measurements and velocity adjustments. Harvesting and grain unloading system 20 comprises harvester 22 and grain unloader 50.

Harvester 22 (schematically shown) comprises an agricultural vehicle that separates or removes crop from a growing medium as the vehicle traverses the growing medium or field. In some implementations, harvester 22 comprises a threshing mechanism to separate grains of the crop from other plant portions of the crop. In some implementations, harvester 22 comprises a tank or other volume for temporarily containing and storing grain that has been harvested prior to the harvested grain being unloaded. In one implementation, harvester 22 is specifically configured to harvest a particular type of crop, unloading a particular type of grain. In other implementations, harvester 22 is adaptable, such as through the mounting of different heads, to harvest different types of crop, wherein harvester 22 may unload different types of grain. Examples of different types of grain that may be harvested by such a harvester 22, include but are not limited to, corn, soybeans, oats, wheat, sorghum, barley and the like.

Grain unloader 50 comprises a system that unloads harvested grain from harvester 22 into a grain carrier. In one implementation, grain unloader 50 unloads harvested grain into a grain carrier positioned alongside harvester 22 while harvester 22 is stationary. In another implementation, grain unloader 50 unloads harvested grain into a grain carrier positioned alongside harvester 22 while harvester 22 is traversing a field or even while harvester 22 is continuing to harvest the crops from the field. Grain unloader 50 comprises grain unloading auger 52 and discharge speed adjustment mechanism 54.

Grain unloading auger 52 comprises an auger project extending from harvester 22 and beyond the sides of harvester 22 for discharging or unloading grain into a grain carrier alongside harvester 22. In one implementation, grain unloading auger 52 is movably supported by harvester 22 for being raised and lowered or pivoted in a horizontal plane. In some implementations, grain unloading auger 52 is telescopic. Grain unloading auger 52 comprises auger housing 60 and auger flights 62. Housing 60 comprises a tubular structure that at least partially surrounds auger flights 62 to guide conveyance of grain along auger 52. Auger flights 62 comprise helically extending flights supported by a shaft, wherein auger flight 62 are rotated by a motor, engine or other actuator, such as an engine and associated transmission of harvester 22, to convey grain from harvester 22 to discharge speed adjustment mechanism 54.

Discharge speed adjustment member (DSAM) 54 (schematically shown) receives grain from auger 52 and, in particular, from auger flights 62. The grain being received from auger flight 62 is supplied at a first speed. In other words, prior to reaching DSAM 54, the individual grains within auger housing 52 are being linearly moved along the axial centerline of Auger 52 at a first speed or speed (distance/time). Discharge speed adjustment mechanism 54 engages the grain received from auger flight 62 and increases the speed of the received grain such that the grain, following engagement by DSAM 54, has a second speed greater than the first speed. The speed increase applied by DSAM 54 is a speed change or increase relative to the speed of the grain as moved by auger flights 62. It should be noted that the overall rate at which grain is unloaded from harvester 20 (the volume of grain being unloaded per unit time (in contrast to the speed-distance traveled per unit time)) is not altered by the grain speed increase applied by DSAM 54 as the rate at which grain is conveyed by Auger 52 remains the same. This second greater speed causes the stream of grain exiting grain unloader 50 to also have a greater speed, shooting out further from the end of grain unloader 50 and into the grain receiver. As a result, the grain unloaded by grain unloader 50 may be more accurately deposited into far reaching corners of the grain carrier. In addition, in some circumstances, harvester 22 may be spaced further apart from the grain carrier during unloading of grain from harvester 22.

In some implementations, DSAM 54 is selectively actuatable between a first state in which DSAM 54 does not alter the speed of the grain being received from Auger 52 and a second state in which DSAM 54, while continuing to receive the grain from the auger flight at the first speed, increases a speed of the grain being received from auger 52 to a second greater speed. In some implementations, DSAM 54 is a variable speed DSAM 54, being selectively activatable to multiple different second velocities, each of the second velocities being greater than the first speed at which the grain is being received from auger flight 62. In such an implementation, the speed increase being imparted to the grain by DSAM 54 is adjustable to address various unloading and environmental conditions. For example, to unload grain to a location in the grain carrier proximate to the end of unloader 50, DSAM 54 may increase the speed of the discharged grain by a first smaller extent and to unload grain to a location in the grain carrier more distant to the end of unloader 50, DSAM 54 may increase the speed of the discharge grain by a second larger extent.

In some implementations, the speed of auger 52 is adjustable. In one implementation, the adjustment of speed of auger 52 is independent of the speed of the grain being discharged by DSAM 54. For example, while DSAM 54 is discharging grain at a speed of V2, auger 52 may be adjusted to convey grain from a first speed V1 to a second greater speed V3, wherein both V1 and V3 are less than V2.

In another implementation, DSAM 54 is linked or synchronized with Auger 52 such that as the speed at which grain is conveyed by auger 52 is adjusted, the higher speed at which DSAM 54 discharges grain is also concurrently adjusted. In one implementation, the speed changes made to auger 52 results in proportional speed changes to DSAM 54. For example, an increase in the conveyance speed of auger 52 by X percent also results in an increase in the conveyance speed of DSAM 54 by the same X percent. In another implementation, the speed changes made auger 52 results in similar changes to the discharge speed of DSAM 54. For example, an increase in the conveyance speed of auger 52 by Y (for example, Y feet per second) also results in increase in the conveyance speed of DSAM 54 by Y.

As schematically shown by FIG. 1, DSAM 54 is located downstream of auger flights 62 so as to receive grain from auger flight 62. DSAM 54 is coupled to auger housing 60, directly or indirectly, proximate to the end of unloader 52. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. In the sense that the bulk grain being conveyed by unloader 52 may be considered a fluid, DSAM 54 is fluidly coupled to auger housing 60. The term "fluidly coupled" means that two or more fluid transmitting volumes are connected directly to one another or are connected to one another by intermediate volumes or spaces such that fluid may flow from one volume into the other volume. As will be described hereafter, in one implementation, DSAM 54 is located within auger housing 60, after or downstream of auger flight 62. In one implementation, DSAM 54 is located within a spout connected to the end of auger housing 60. In one implementation, DSAM 54 is located downstream or after the end of auger housing 60 or after the end of a spout that extends from auger housing 60.

In one implementation, DSAM 54 comprises at least one grain contacting and driving structure which imparts force to the grain to move the grain at the second greater speed. For example, in one implementation, DSAM 54 comprises rotating paddles or a conveyor belt having grain moving paddles or cleats. In another implementation, DSAM 54 comprises a grain moving belt that omits paddles or cleats. In another implementation, DSAM 54 comprises a mechanism that selectively alters a cross-sectional area of a discharge opening through which grain supplied by auger flights 62 is discharged. In circumstances where the grain being discharged behaves similar to that of a fluid, reducing the cross-sectional area of the discharge opening increases the speed of the stream of grain. Likewise, increasing the cross-sectional area of the discharge opening reduces the speed of the stream of grain.

Figure 2:
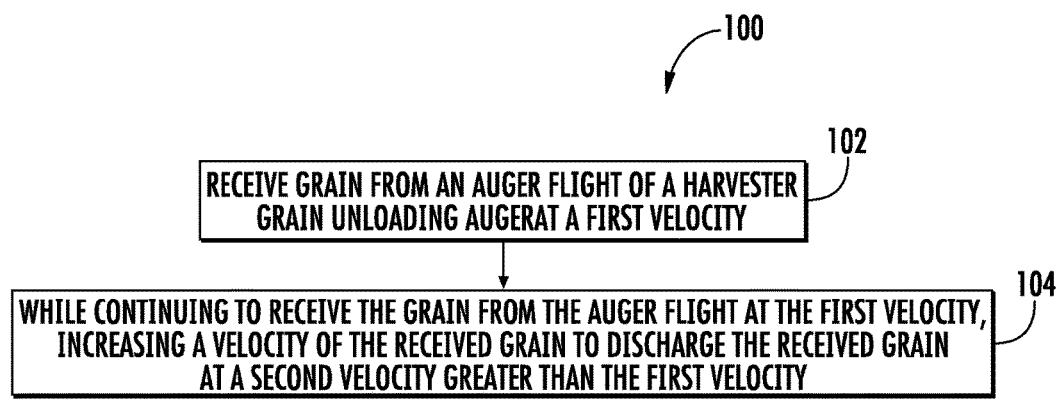
FIG. 2 is a flow diagram of an example method for unloading grain from a harvester.

FIG. 2 is a flow diagram of an example method method 100 for unloading grain from a harvester. Method 100 facilitates more controlled unloading of grain from a harvester into a grain carrier. Although method 100 is described in the context of grain unloader 50 and system 20, it should be appreciated that method 100 may additionally be carried out by any of the grain unloaders and grain harvesting and unloading systems described hereafter.

As indicated by block 102, DSAM 54 receives grain from auger flight 62 of a harvester grain unloading auger 52. The grain being received from auger flight 52 is at a first speed.

As indicated by block 104, while continuing to receive the grain from auger flight 62 at the first speed, DSAM 54 increases a speed of the received grain to discharge the received grain at a second speed greater than the first speed. For example, in one implementation, the speed at which the grain driving paddles of DSAM 54 are rotated or the speed at which the conveyor belt of DSAM 54 is such that the grain driven by DSAM 54 has the second greater speed. In another implementation, in which the grain behaves similar to that of a fluid, the cross-sectional area of the discharge opening, downstream of auger flight 62, is changed and reduced to increase the speed of the stream of grain being discharged through the discharge opening.

Figure 3:
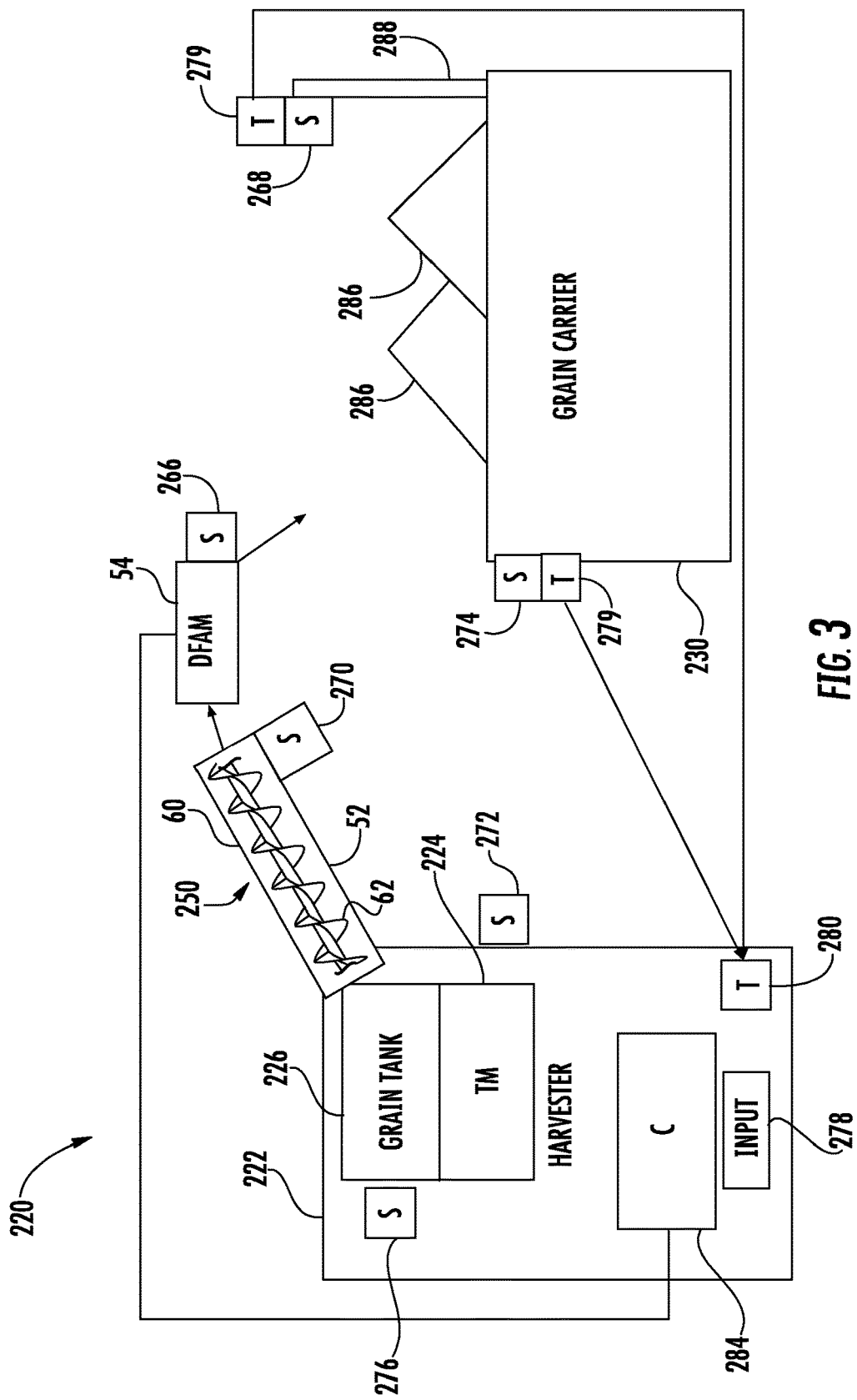
FIG. 3 is a schematic diagram illustrating an example harvesting and grain unloading system having an example grain unloader.

FIG. 3 schematically illustrates grain harvesting and unloading system 220. System 220 comprises harvester 222 and grain unloader 250. Harvester 222 (schematically illustrated) is similar to harvester 22 described above except that harvester 222 is specifically illustrated as comprising threshing mechanism 224 and grain tank 226. Threshing mechanism 224 comprises a device to separate the kernels of grain from the remaining portions of the plant. In one implementation, threshing mechanism 224 comprises a concave, and sieves or louvers. In other implementations, threshing mechanism 224 may comprise other components to separate the kernels of grain from the remaining portions of the plant. Such remove kernels are conveyed and stored in grain tank 226 prior to being unloaded by grain unloader 250.

Grain unloader 250 unloads the grain from grain tank 226 into a grain carrier 230 (schematically illustrated). Grain carrier 230 comprises a semi-truck hauler, wagon, grain carrier or other type of vehicle or pulled implement having a volume for receiving grain unloaded from harvester 222. As with grain unloader 50, grain unloader 250 adjusts the speed of the grain being unloaded or discharged at or proximate the point at which the grain leaves system 220 to facilitate greater control over the filling of a grain carrier, such as grain carrier 230. Grain unloader 250 comprises grain unloading auger 52 and DSAM 54 as described above. Grain unloader 250 additionally comprises sensors 266, 268, 270, 272, 274, 276, input 278, transceivers 279, transceiver 280 and controller 284.

Sensor 266 comprises a sensor carried by grain unloader 250 or other portions of harvester 222 that senses the shape or profile of the bulk grain 286 resting within grain carrier 230. In one implementation, sensor 266 additionally senses the location where the stream of grain from unloader 250 is impacting the existing grain within carrier 230 or surfaces of grain carrier 230. In one implementation, sensor 266 is carried at the end of the spout or otherwise proximate to the final discharge opening of unloader 250 so as to obtain a more comprehensive view of the interior grain carrier 230. In one implementation, sensor 266 comprises a camera which captures images of grain carrier 230 and its current contents, wherein image analytics or image processing is utilized to compare different images to determine the existing profile or shape of, how the shaper profile of bulk grain 286 is changing in response to newly added grain and in response to vibration resulting from grain carrier 230 traversing the underlying potentially uneven terrain. In other implementations, sensor 266 may comprise other technologies such as Lidar or the like. Such gathered information or data is transmitted to controller 284.

Sensor 268 is similar to sensor 266 except that sensor 268 is supported by grain carrier 230. In the example illustrated, sensor 268 is supported by a grain backstop 288. In other implementations where grain carrier 230 omits grain backstop 288, sensor 268 may be mounted or supported at other locations over or above the grain storing interior of grain carrier 230. In some implementations, sensor 268 may alternatively be supported by a vehicle pulling grain carrier 230, such as a top of the cab or other structure of a tractor. In some implementations, the characteristics of the grain piles within carrier 230 may be determined from data acquired by multiple sensing elements provided at different locations along grain carrier 230. Sensor 268 gathers and senses the same information gathered by sensor 270. Such information is transmitted to controller 284 in a wired or wireless fashion. In one implementation, sensor 268 transmits such information in a wireless fashion to controller 284 via transceiver 279, carried by grain carrier 230 and transceiver 280, carried by harvester 222. In some implementations, one or both of sensors 266 and 268 may be omitted.

Sensor 270 comprises a sensing device that senses the speed of grain. In one implementation, sensor 270 senses the speed at which grain leaves auger flights 62 and is received by DSAM 54. In one implementation, sensor 270 additionally or alternatively senses the speed imparted to the grain by DSAM 54. In one implementation, sensor 270 may additionally or alternatively sense the volume of grain being processed through the system per unit time. For example, in one implementation, sensor 270 may additionally or alternatively sense the number of bushels of grain being conveyed per unit time to DSAM 54. In one implementation, sensor 270 comprises a camera that captures images of moving grain through a transparent window or through transparent windows, wherein image processing utilized to identify the speed of bulk grain or individual kernels of grain. In other implementations, sensor 270 may comprise other sensing technologies that facilitate the sensing of the speed of the grain or grain kernels along the various portions of unloader 250. Such data or information is transmitted by sensor 270 to controller 284.

Sensor 272 comprises a device to sense at least one of the relative positioning or spacing between harvester 222 and grain carrier 230, the orientation (roll, pitch and/or yaw) of harvester 222 and the orientation (roll, pitch and/or yaw) of grain carrier 230. Sensor 272 is carried by harvester 222 or grain unloader 250. Sensor 274 is similar to sensor 272 except that sensor 274 is carried by grain carrier 230. In one implementation, sensors 272 and 274 each comprise cameras, wherein image processing or analytics to utilize to determine the relative positioning and orientations of harvester 222 and grain carrier 230 from the captured images. In some implementations, the functions of sensors 272, 274 may be carried out by multiple independent sensing elements. For example, the relative spacing may be determined by first sensing element, such as a camera, while the orientation may be carried out by a second sensing element, such as a accelerometer, gyroscope or the like. In some implementations, the relative spacing may be determined from data acquired by multiple sensing elements provided at different locations along harvester 222 and/or grain carrier 230. Likewise, the orientation may be provided or determined from signals from a plurality or a combination of multiple different sensing elements at different locations along harvester 222 or grain carrier 230. In other implementations, sensors 272 and 274 may comprise other sensing technologies.

Such data captured by sensors 272 and 274 are transmitted to controller 284. Signals and data from sensor 274 are transmitted to controller 284 in a wired or wireless fashion. In the example illustrated, signals and data from sensor 274 are transmitted by wireless transceiver 279, carried by grain carrier 230, two wireless transceiver 280 which communicate such signals and data to controller 284. In some implementations, one or both of sensors 272, 274 may be omitted.

Sensor 276 comprises a sensing device carried by harvester 222 that senses at least one characteristic of the grain being harvested by harvester 222 and ultimately being unloaded from harvester 222 by grain unloader 250. In one implementation, sensor 276 senses the type of grain being unloaded, such as whether the grain unloaded is corn, wheat, barley, oats or the like. In one implementation, sensor 276 additionally or alternatively senses the size, mass and/or moisture content of the grain being unloaded. Although sensor 276 is illustrated as being adjacent to grain tank 226, sensing the grain within grain tank 226, sensor 276 may additionally or alternatively be provided at other locations such as along grain conveyors or grain augers within harvester 222 or along auger 52 or DSAM 54. In some implementations, sensor 268 may additionally or alternatively sense characteristics of the grain being harvested.

In one implementation, sensor 276 comprises a camera, wherein optical imaging is applied to the captured images to determine such characteristics as the type of grain as well the size or mass of the grain. In one implementation, sensor 276 may additionally comprise a moisture meter which senses the moisture the grain. As indicated above, each of such sensors described herein may include multiple sensing elements which act in concert with one another to provide certain data or which independently sensed different conditions or characteristics.

Input 278 comprises a user interface by which an operator may interact with controller 284, providing input as well as commands or selections. In one implementation, input 278 may comprise a display and one or more manual inputs via pushbuttons, keys, switches, touchpad, a touch screen, a keyboard, a mouse, a joystick or the like. In some implementations, input 270 may comprise a transceiver that communicates with the operator's portable electronic device or smart phone. In one implementation, input 278 prompts the operator to input characteristics of the grain being harvested and/or the moisture the grain being harvested. In some implementations, such data provided by input 278 may be utilized in lieu of data from sensor 276, wherein sensor 276 may be omitted. In implementations where data from sensor 276 is utilized, prompts from input 278 requesting input from the operator regarding characteristics of the grain may be omitted.

Controller 284 comprises a processing unit that receives and analyzes data or information from one or more of sensors 266, 268, 270, 272, 274 and 276. In some implementations, controller 284 further receives data from input 278. For purposes of this application, the term "processing unit" shall mean a presently developed or future developed computing hardware that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 284 may be embodied as part of one or more application-specific integrated circuits (ASICs). Unless otherwise specifically noted, the controller is not limited to any specific combination of hardware circuitry and software, nor to any particular source for the instructions executed by the processing unit.

Controller 284 utilizes the data from sensors 266, 268, 270, 272, 274, 276 and/or input 278 to control grain unloader 250. For example, in one implementation, such data is utilized by controller 284 to output control signals that are transmitted to an actuator associated with auger 52 to automatically adjust the positioning and/or orientation of auger 52. In one implementation such data is utilized by controller 284 to output control signals to automatically adjust the speed at which harvester 222 is traversing a field during unloading.

In one implementation, controller 284 additionally controls the operation of DSAM 54 based upon data from sensors 266, 268, 270, 272, 274, 276 and/or input 278. For example, in one implementation, the power applied to DSAM 54 or the amount of force that DSAM 54 applies to the grain being unloaded may be adjusted by controller 284 based upon the type of grain being unloaded, the size of the particular kernels of grain being unloaded and/or the weight or moisture content of the grain being unloaded. To achieve a same predetermined speed for the grain exiting DSAM 54 may require different operating characteristics for DSAM 54 depending upon the type of grain being unloaded or its mass or moisture content. In some implementations, controller 284 may vary the second speed, the lot to the grain being discharged by DSAM 54 based upon data from sensors 266, 268, 270, 272, 274, 276 and/or input 278. For example, to direct a stream of grain to a particular location within grain carrier 230 may require a different speed for a first type of grain as compared to a second different type of grain or may require a different speed for a type of grain having a first weight or moisture content as compared to the same type of grain having a different weight or moisture content. In one implementation, each of such adjustments is carried out automatically in response to such data. In other implementations, one or more of such adjustments described herein is presented on input 278 to the operator as a recommendation, wherein the operator may make the final decision as to whether to implement the recommended adjustment by entering a command or selection with input 278.

In one implementation, controller 284 facilitates an enhanced automated unloading of harvester 222, allowing the operator to focus his or her attention on other aspects of harvest. For example, in one implementation, controller 284 automatically senses when harvester 222 and grain carrier 230 are appropriately positioned relative to one another for unloading. In one implementation, controller 284 automatically swings or moves auger 52 out to position proximate to grain carrier 230. Based on the type of grain being unloaded as well as various characteristics of the grain being unloaded, such as the size and mass or moisture content of the grain being unloaded, controller 284 performs angle of repose, speed and momentum calculations. Once such calculations are completed, controller 284 initiates the unloading of the grain into carrier 230 by outputting control signals to the various motors and actuators that drive auger 52 and DSAM 54. In one implementation where unloading occurs while harvester 222 is traversing a field, controller 284 may additionally transmit signals to grain carrier 230 or the vehicle pulling grain carrier 230 to synchronize or appropriately control the speed of such two different vehicles during unloading.

During unloading, controller 284 utilizes the determined angle of repose, the rate (volume per unit time) at which grain is being discharged, and speed and momentum calculations to carry out vectored grain unloading control (VGUC), controlling the direction of discharge as well as the speed of grain discharge as provided by DSAM 54. During unloading, controller 284 utilizes data from sensors 266 and 268 to continuously scan, in real-time, the grain surface profile in grain carrier 230, determining current fill of grain carrier 230 based upon the height of the grain surface scan. Based upon the current fill of grain carrier 230 as well as the height of the various mounds within grain carrier 230, controller 284 automatically make decisions to optimize unloading grain into carrier 230, considering the angle of repose, volume of grain carrier 230, rate at which grain is being discharged (supplied to DSAM 54) and the current fill height. To optimize grain loading, controller 284 automatically adjusts the spout/boot orientation, throat opening and positioning of auger 52 as well the speed applied to the grain by DSAM 54. The vectored grain or position in which the grain stream enters grain carrier 230 is a function at least partially based upon direction and speed. Once carrier 230 is sufficiently full, controller 284 terminates such unloading.

Figure 4:
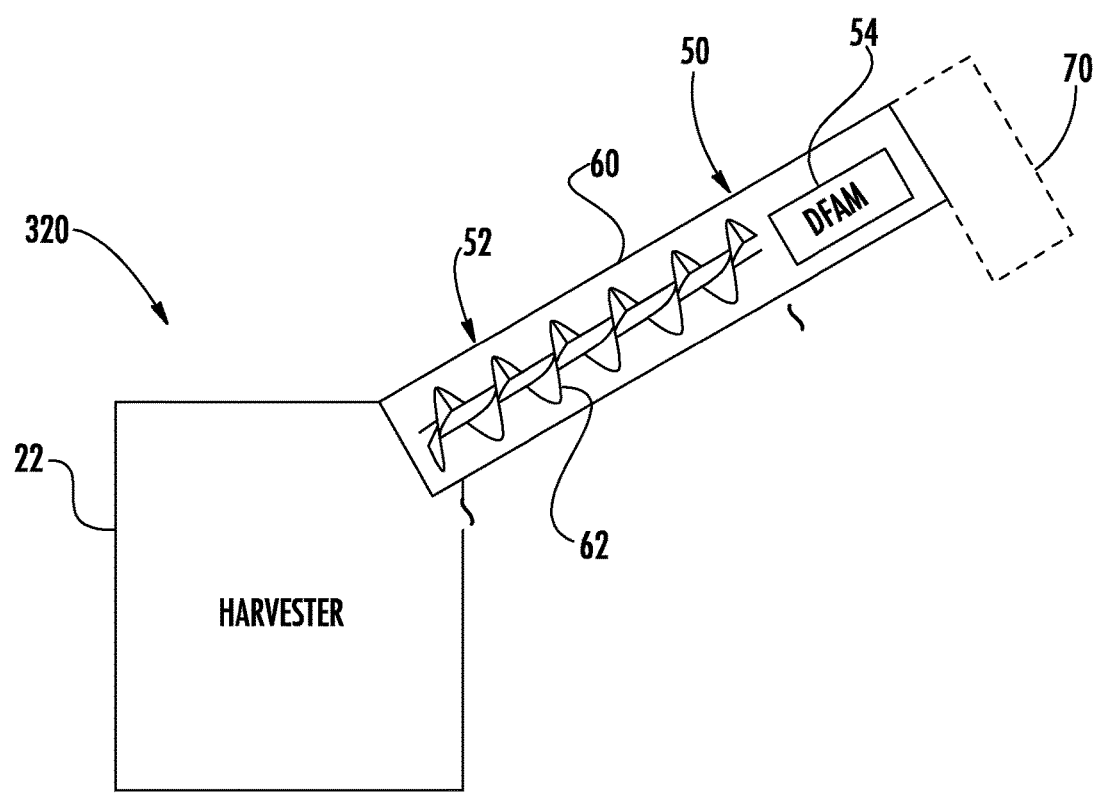
FIG. 4 is a schematic diagram of an example harvesting and grain unloading system having an example grain unloader.
Figure 5:
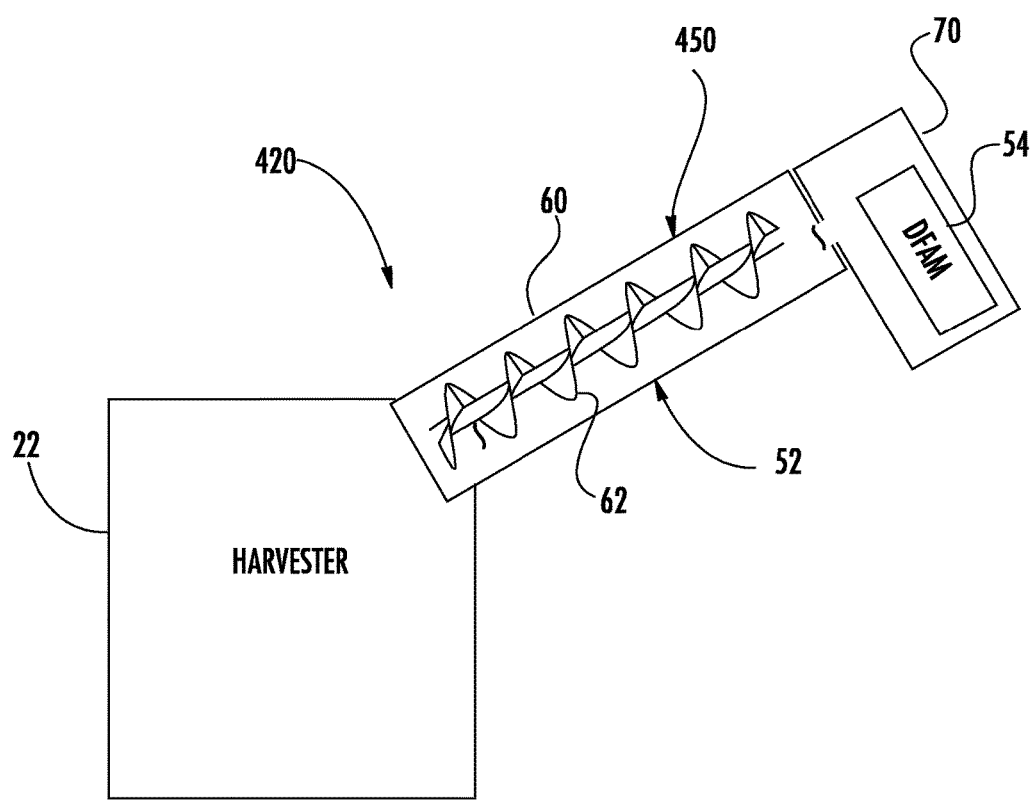
FIG. 5 is a schematic diagram of an example harvesting and grain unloading system having an example grain unloader.
Figure 6:
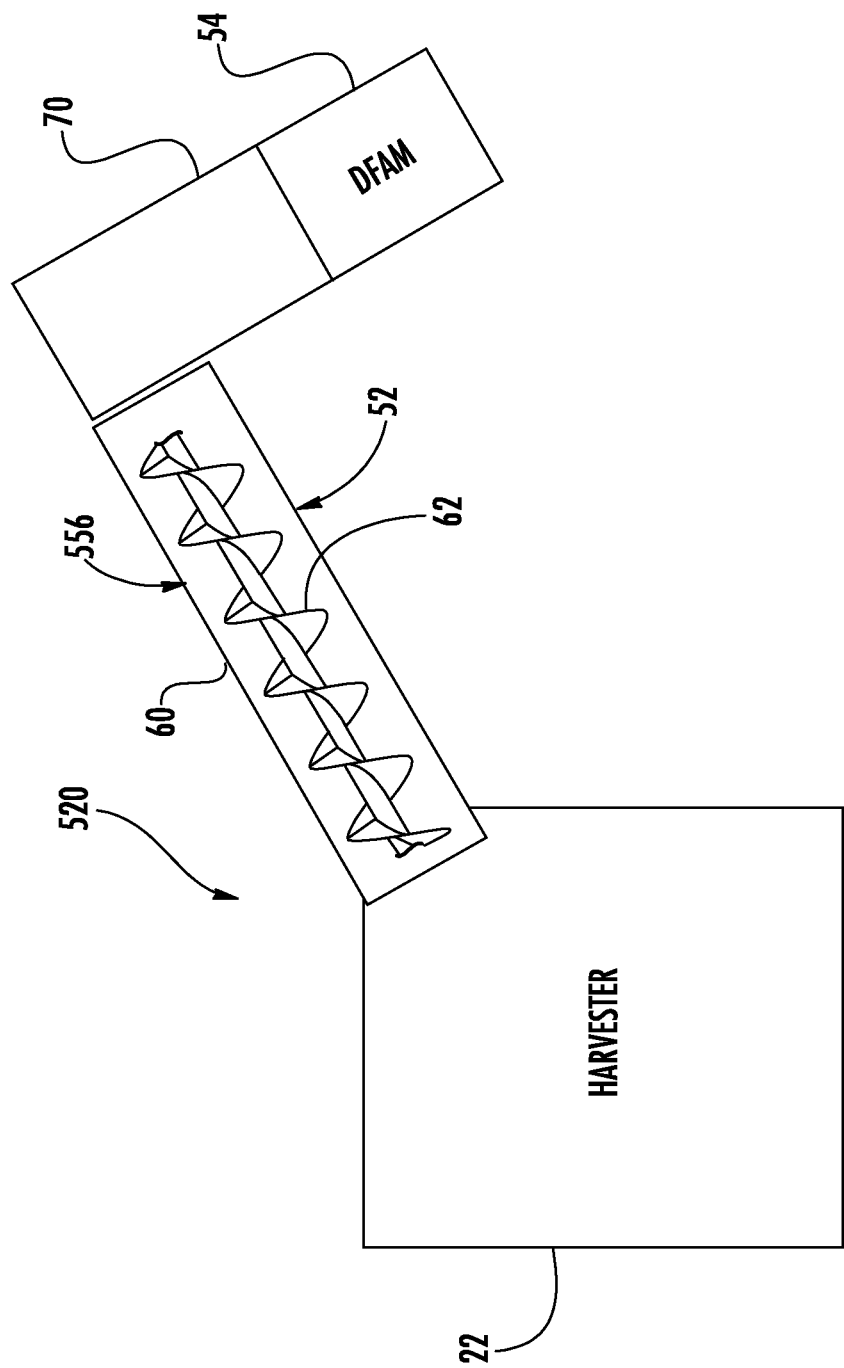
FIG. 6 is a schematic diagram of an example harvesting and grain unloading system having an example grain unloader.

FIGS. 4-6 schematically illustrate various examples of grain unloading system 20. Each of such systems illustrated by FIGS. 4-6 illustrates a specific example location for DSAM 54. It should be appreciated that each of the example locations illustrated for DSAM 54 may be utilized in grain unloading system 220 described above. In addition, grain unloading system 250 may comprise a spout as illustrated in FIGS. 5 and 6, wherein DSAM 54 is in the spout or downstream of the spout.

FIG. 4 schematically illustrates grain loading system 320. System 320 similar to system 20 except that system 320 is illustrated as specifically locating DSAM 54 within auger housing 60, downstream or following auger flights 62. DSAM 54 receives grain from auger flights 62 at a first speed, whereas DSAM 54 discharges the grain at a second greater speed. Although FIG. 4 illustrates the terminal end point of grain unloader 50 as being the end of auger housing 60, wherein grain unloader 50 does not include a spout, in other implementations, as indicated by broken lines, grain unloader 50 may additionally comprise a spout 70 coupled to and supported by auger housing 60, downstream of DSAM 54.

FIG. 5 schematically illustrates grain unloading system 420. System 420 is similar to system 20 except that system 420 illustrates a grain unloader 450 as specifically comprising spout 70. As further shown by 5, DSAM 54 is located within spout 70. In one implementation, spout 70 is movably positioned relative to auger housing the positioning and orientation a spout 70 may be further controlled, such as using a powered actuator, to further facilitate control over the discharge of grain into a grain carrier.

FIG. 6 schematically illustrates grain loading system 520. System 520 is similar to system 20 except that system 520 illustrates a grain unloader 550 as specific comprising spout 70, wherein DSAM 54 is coupled are mounted to spout 70 at the end of spout 70. In one implementation, DSAM 54 comprises an accessory or attachment movably coupled to the end of spout 70.

Figure 7:
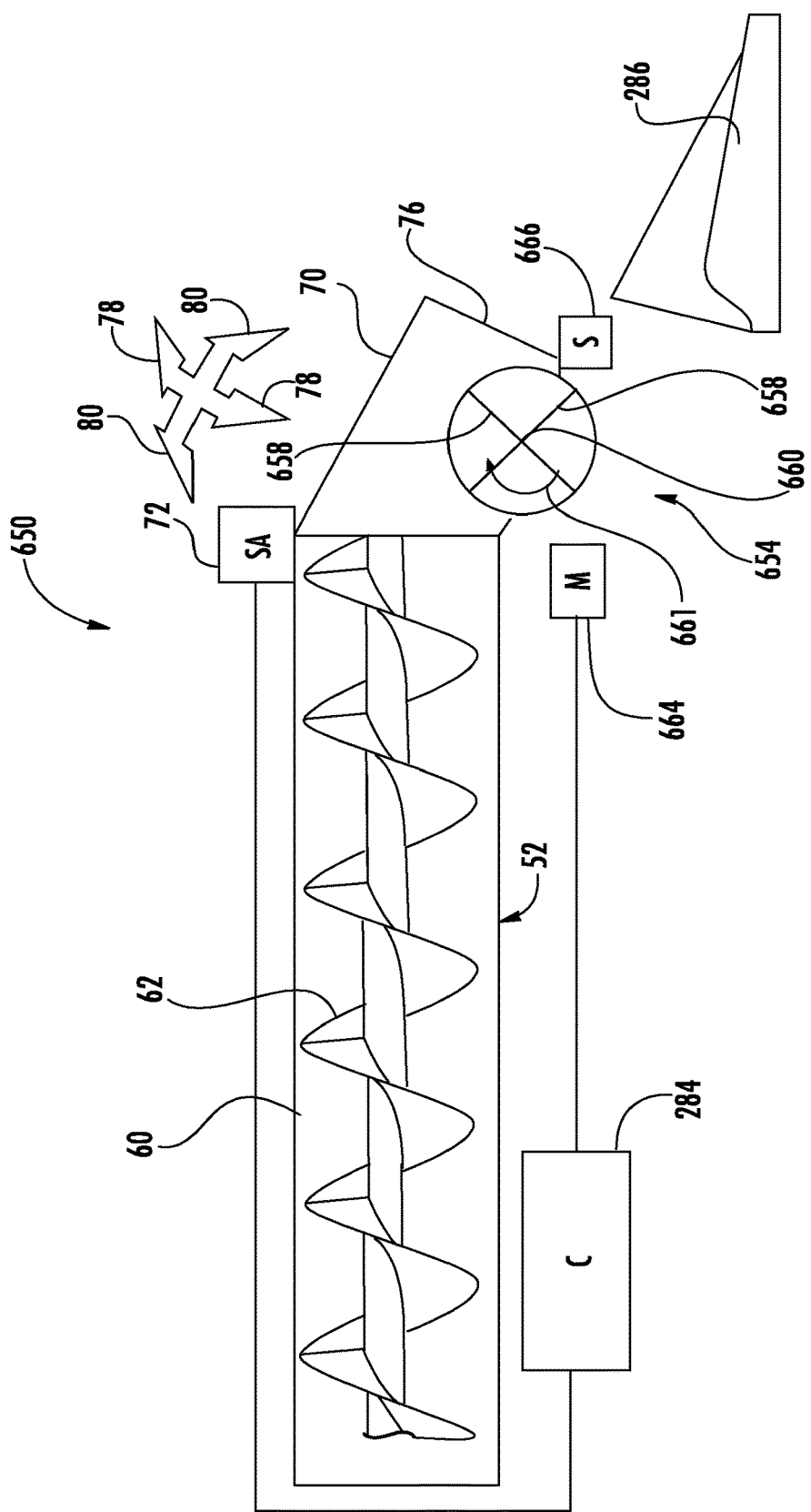
FIG. 7 is a schematic diagram of an example grain unloader.

FIG. 7 schematically illustrates an example grain unloader 650. Grain unloader 650 comprises auger 52 (described above), spout 70, spout actuator 72, DSAM 654, sensor 666 and controller 684. Spout 70 is movably coupled to an end of auger housing 60 and provides a final discharge opening 76 through which grain is discharged into a grain carrier. Spout actuator 72 comprises a mechanism operably coupled to spout 70 so as to move spout 70 so as to control the direction (as indicated by arrows 78 and 80) of spout 70.

DSAM 654 is located within spout 70. DSAM 54 receives grain from auger 52 and from auger flights 62 at a first speed. DSAM 654 imparts a second speed, greater than the first speed to the grain such that the grain being discharged through discharge opening 76 has a greater speed as compared to the speed of the grain being discharged through opening 76 in the absence of DSAM 654. DSAM 654 comprises a plurality of paddles 658 which rotate about a horizontal axis 660 as indicated by arrow 661. Such paddles 658 are rotationally driven by an actuator 664 (shown as a motor M).

Sensor 666 is similar to sensor 270 described above. Sensor 666 is coupled to or carried by or at the end of spout 70. Sensor 666 senses the grain pile 286 within a grain carrier. Such data, in the form of signals, is transmitted to controller 284.

Controller 284 comprises a processing unit that controls spout actuator 72 and actuator 664 based at least in part upon signals from sensor 666 to control the discharge of grain in the filling of the grain carrier. It should be appreciated that spout 70, spout actuator 72 and DSAM 654 may be incorporated into system 220 described above, wherein controller 284 may additionally control spout actuator 72 and DSAM actuator 664 based upon other data such as data received from sensors 268, 270, 272, 274, 276 and/or input 278. Because DSAM 654 is within spout 70, such a speed increase or speed adjustments may be made closer to discharge opening 76, providing enhanced control over the discharge and deposition of grain 286 within a grain carrier.

Figure 8:
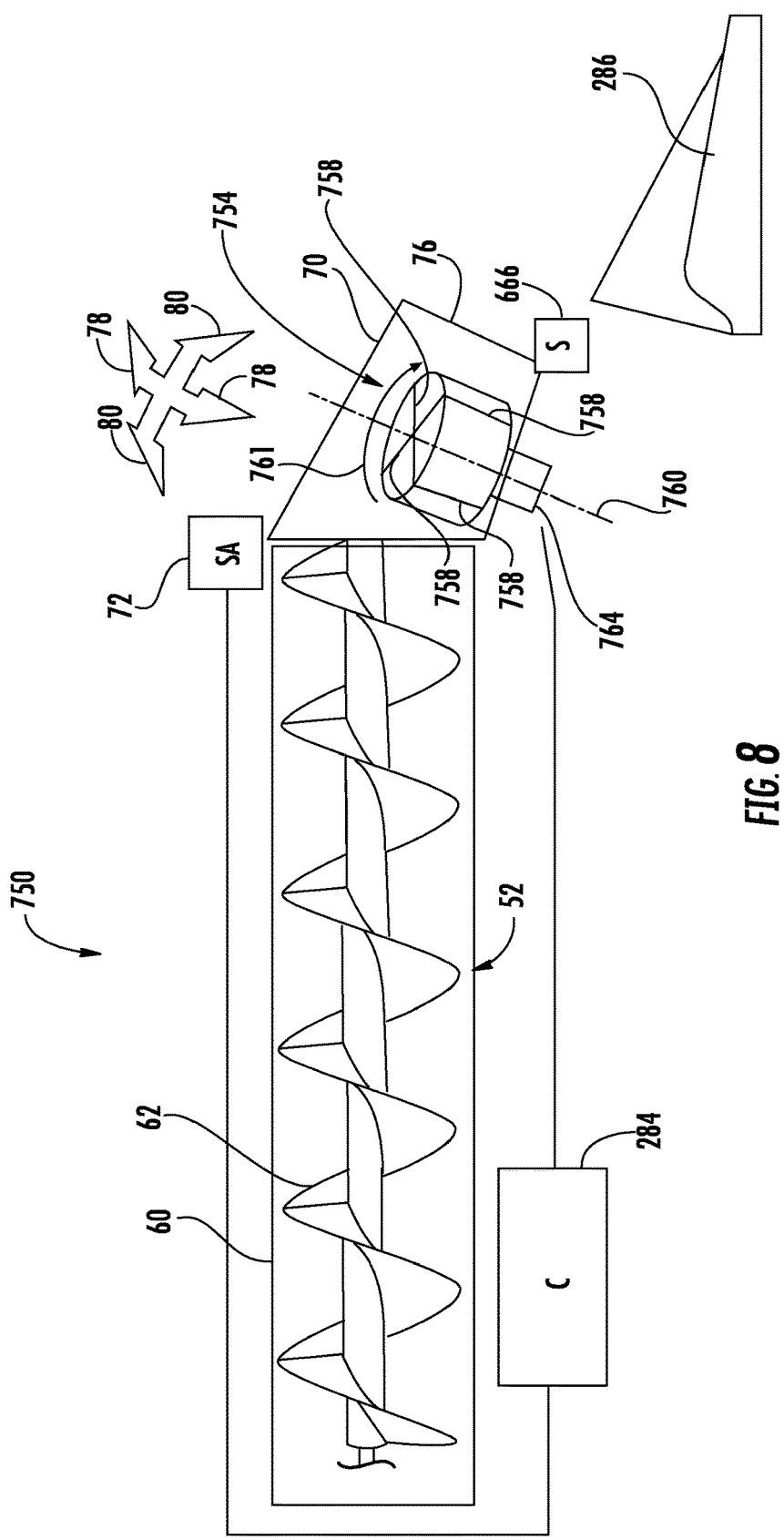
FIG. 8 is a schematic diagram of an example grain unloader.

FIG. 8 schematically illustrates grain unloader 750. Grain unloader 750 is similar to grain unloader 650 described above except that grain unloader 750 comprises DSAM 754 in place of DSAM 654. The remaining components of grain loader 750 which correspond to components of grain loader 650 are numbered similarly.

DSAM 754 is located within spout 70. DSAM 754 receives grain from auger 52 and from auger flights 62 at a first speed. DSAM 754 imparts a second speed, greater than the first speed to the grain such that the grain being discharged through discharge opening 76 has a greater speed as compared to the speed of the grain being discharged through opening 76 in the absence of DSAM 754. DSAM 754 comprises a plurality of paddles 758 which rotate about a vertical or inclined axis 760 as indicated by arrow 761. Such paddles 758 are rotationally driven by an actuator 764 (shown as a motor M).

Controller 284 comprises a processing unit that controls spout actuator 72 and actuator 764 based at least in part upon signals from sensor 666 to control the discharge of grain in the filling of the grain carrier. It should be appreciated that spout 70, spout actuator 72 and DSAM 754 may be incorporated into system 220 described above, wherein controller 284 may additionally control spout actuator 72 and DSAM actuator 764 based upon other data such as data received from sensors 268, 270, 272, 274, 276 and/or input 278. Because DSAM 754 is within spout 70, such a speed increase or speed adjustments may be made closer to discharge opening 76, providing enhanced control over the discharge and deposition of grain 286 within a grain carrier.

Figure 9:
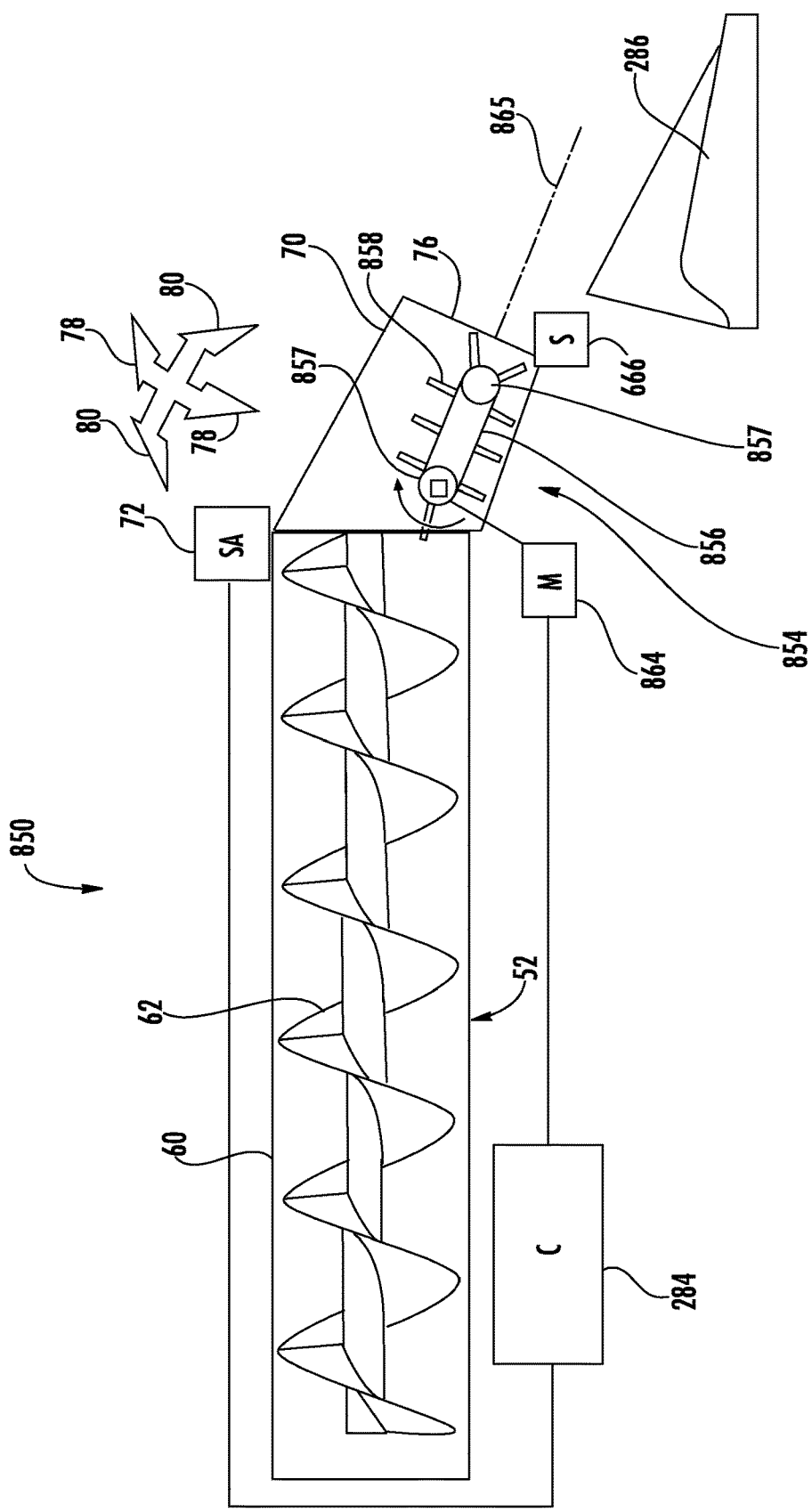
FIG. 9 is a schematic diagram of an example grain unloader.

FIG. 9 schematically illustrates grain unloader 850. Grain unloader 850 is similar to grain unloader 650 described above except that grain unloader 850 comprises DSAM 854 in place of DSAM 654. The remaining components of grain loader 850 which correspond to components of grain loader 650 are numbered similarly.

DSAM 854 is located within spout 70. DSAM 854 receives grain from auger 52 and from auger flights 62 at a first speed. DSAM 854 imparts a second speed, greater than the first speed to the grain such that the grain being discharged through discharge opening 76 has a greater speed as compared to the speed of the grain being discharged through opening 76 in the absence of DSAM 854. DSAM 854 comprises a conveyor belt 856 driven about two sprockets or pulleys 857 and carrying a plurality of paddles 858. One of the pulleys or sprockets 857 is rotationally driven by an actuator 864 (shown as a motor M) which results in paddles 858 being linearly translated and moved along an axis 865. Although the conveyor belt and pulleys/sprockets are illustrated as contained within spout 70, in other implementations, the conveyor belt and pulley/sprockets may alternatively be located external to spout 70 while paddles 858 are located within spout 70.

Controller 284 comprises a processing unit that controls spout actuator 72 and actuator 864 based at least in part upon signals from sensor 666 to control the discharge of grain in the filling of the grain carrier. It should be appreciated that spout 70, spout actuator 72 and DSAM 854 may be incorporated into system 220 described above, wherein controller 284 may additionally control spout actuator 72 and DSAM actuator 864 based upon other data such as data received from sensors 268, 270, 272, 274, 276 and/or input 278. Because DSAM 854 is within spout 70, such a speed increase or speed adjustments may be made closer to discharge opening 76, providing enhanced control over the discharge and deposition of grain 286 within a grain carrier.

Figure 10:
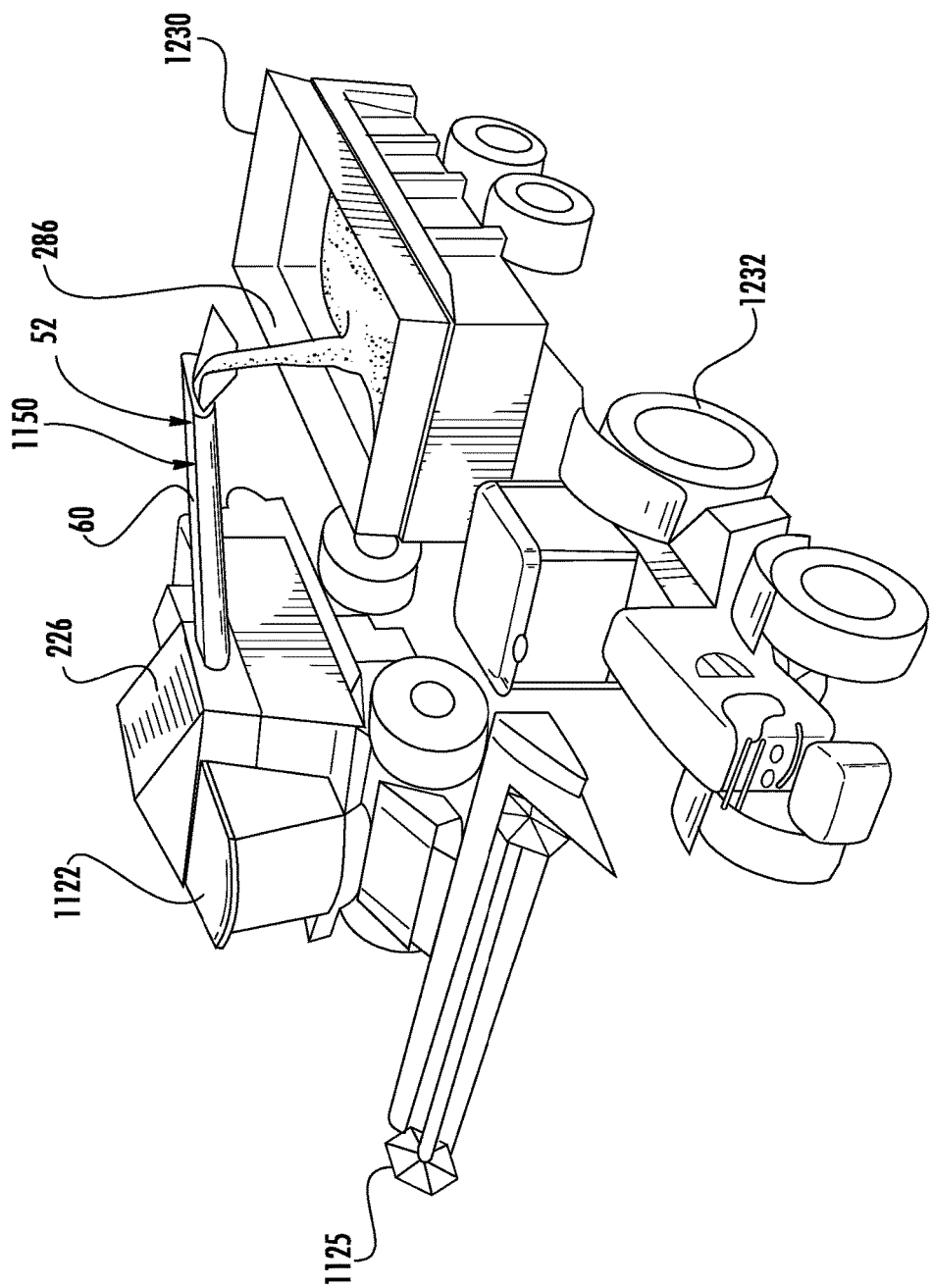
FIG. 10 is a perspective view of an example harvester unloading grain with an example grain unloader into an example grain carrier.

FIG. 10 illustrates an example harvester 1122 having grain unloader 1150 unloading grain 286 into an example grain carrier 1230 being pulled by an example tractor 1232. As shown by FIG. 10, harvester 1122 comprises a head that separates the crop plants from the ground in a field. In the example illustrated, harvester 1122 further comprises an internal threshing mechanism to 24 (shown in FIG. 3) which separates the kernels of grain from the remaining plant portions. The grain is then stored in a grain tank 226 prior to being unloaded by grain unloader 1150. In one implementation, grain unloader 1150 comprises grain unloader 250 described above. In other implementations, grain unloader 1150 may comprise any of grain unloaders described in FIGS. 4-13.

Figure 11:
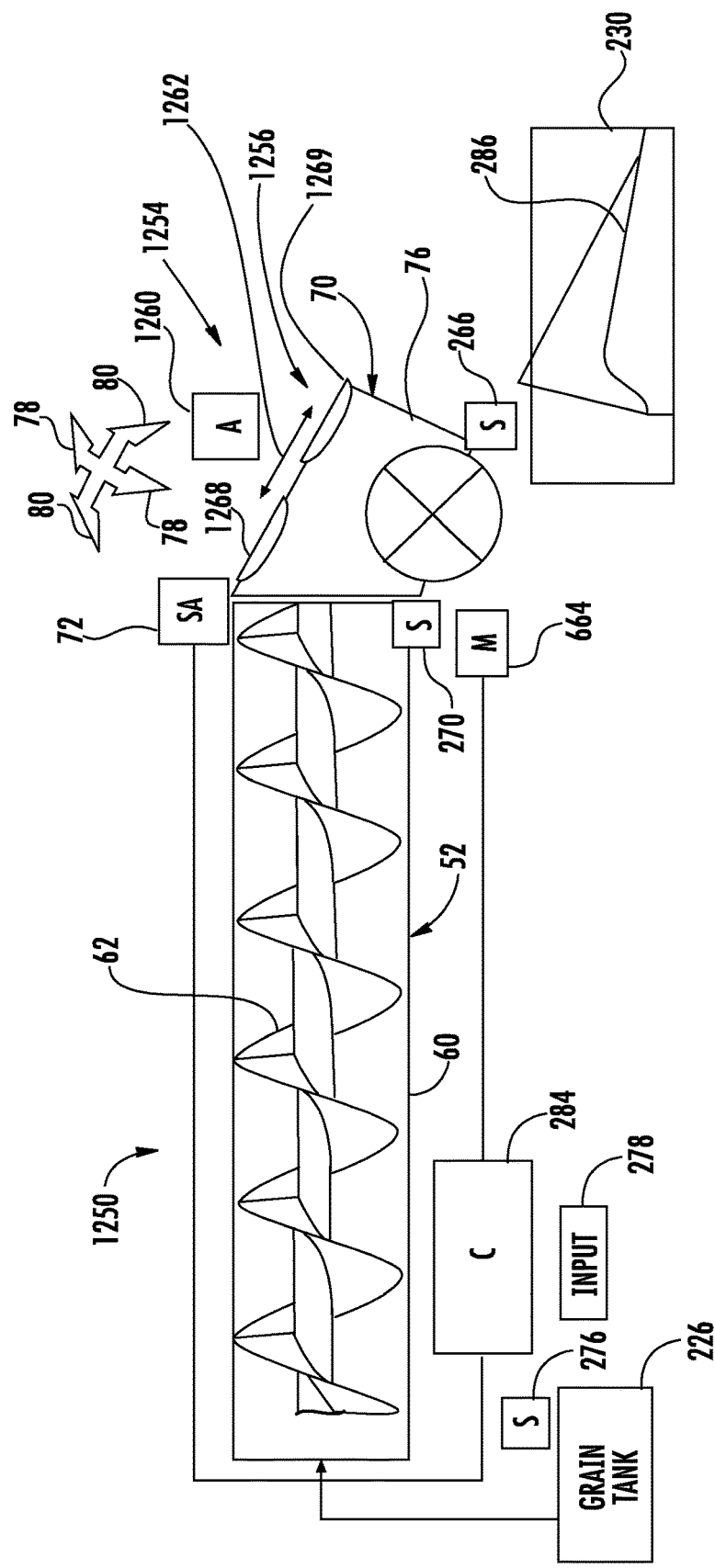
FIG. 11 is a schematic diagram of an example grain unloader.

In one implementation, grain unloader 1150 may comprise the grain unloader 1250 shown in FIG. 11. Grain unloader 1250 is similar to grain unloader 650 described above except that grain unloader 1250 additionally comprises spout directional control system 1254. Those additional components of grain unloader 1250 which correspond to components of unloader 650 or grain unloader 250 are numbered similarly or are shown in FIG. 3.

Spout directional control system 1254 is carried by spout 70 and further facilitates a change to the shape of spout 70 so as to adjust the direction of the stream of grain being discharge from spout 70. Spout directional control system 1254 comprises at least one active surface 1256 and an actuator 1260. In the example illustrated, surface 1256 is movable in the direction indicated by arrows 1262. Surface 1256 projects into the volume of spout 70. Actuator 1260 comprises a mechanism to selectively move surface 1256 from the first position 1268 to the second position 1269. In one implementation, actuator 960 may comprise a hydraulic or pneumatic actuator. In another implementation, actuator 1260 may comprise an electric solenoid or other actuators that linearly translate or rotate surface 1256 to different.

FIG. 11 illustrates DSAM 1254 in different unloading states. In the first state in which surface 1256 is at position 1268, active surface 1256 is in an axially rearward position. In the second state, actuator 960 has moved surface 1256 to a second position proximate to discharge opening 76 such that grain is reflected off of surface 1256 in a downward direction upon exiting discharge opening 76. The change in shape of spout 70 brought about by the movement of active service 1256 redirects the stream of grain exiting spout 70.

Controller 284 comprises a processing unit that controls actuator 1260 based at least in part upon signals from sensor 666 to control the discharge of grain and the filling of the grain carrier. It should further be appreciated that spout directional control system 1254 may be incorporated into system 220 described above, wherein controller 284 may additionally control spout directional control system 1254 based upon other data such as data received from sensors 268, 270, 272, 274, 276 and/or input 278.

Figure 12:
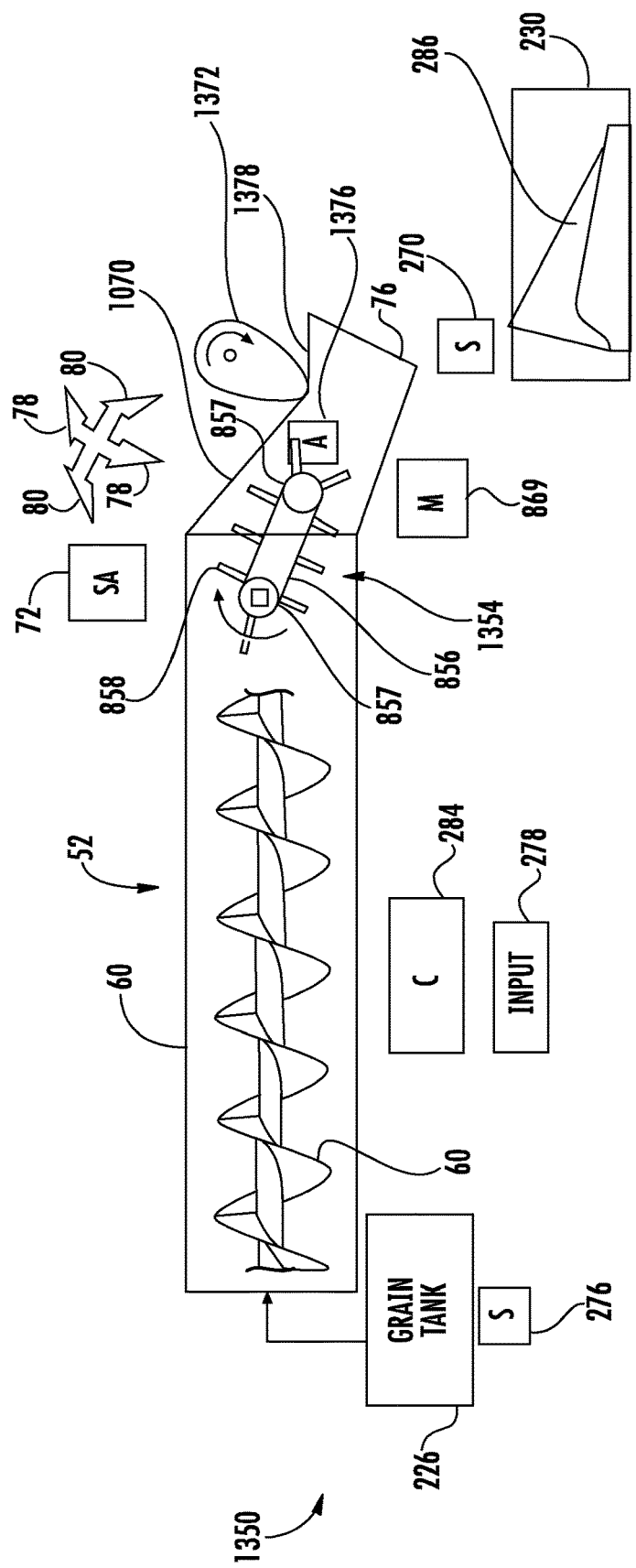
FIG. 12 is a schematic diagram of an example grain unloader.

FIG. 12 illustrates grain unloader 1350. Grain unloader 1350 is similar to grain unloader 850 described above except that grain unloader 1350 additionally comprises spout directional control system 1354. Unlike with grain unloader 850, DSAM 854 extends within both auger housing 60, after auger flight 62 and spout 170. Those additional components of grain unloader 1350 which correspond to components of unloader 350 or grain unloader 250 are numbered similarly or are shown in FIG. 3.

Spout directional control system 1354 is carried by spout 1070 and further facilitates a change to the shape of spout 1070 so as to adjust the direction of the stream of grain being discharge from spout 1070. Spout 1070 is coupled to the end of auger housing 60 and comprises a resiliently compressible and/or flexible portion 1378. In one implementation, the compressible and stretchable portion 1378 comprises an elastomeric panel, formed from a stretchable rubber or the like, extending across an opening or window in the outer walls of spout 1070. In another implementation, the entirety of spout 1070 or an annular ring portion of spout 1070 are formed from such resiliently compressible or stretchable material, such as a rubber-like material.

Cam 1372 comprises a cam mechanism positioned in contact with portion 1378 such that rotation of cam 1372 presses upon such portion 1378 to resiliently stretch or flex portion 1378 in an inward direction so as to change the shape of spout 1070 adjacent portions 1378. Actuator 1376 comprises a mechanism configured to selectively rotate cam 1372. In one implementation, actuator 1376 comprises a motor or electric solenoid. In some implementations, cam 1372 may alternatively be located on the interior spout 1070.

FIG. 12 illustrates DSAM 1354 in a first unloading state. In the first state shown, actuator 1376 has moved portion 1378 inwardly changing the shape of spout 1070 such that grain is deflected off of the stretched portion 1378 in a downward direction upon exiting discharge opening 76. The change in shape of spout 1070 brought about by the movement of portion 1378 redirects the stream of grain exiting spout 1070. Rotation of cam 1372 allows portion 1378 to resiliently return to its unstrapped state, altering the shape of spout 1070 and altering the direction and/or shape of the stream of grain being discharged.

Although cam 1372 is illustrated as being on the exterior of spout 1070, moving portion 1378 inwardly and outwardly to change the shape of the spout 1070 and thereby change the shape and direction of the stream of grain exiting spout 1070, in other implementations, cam 1372 may alternatively be located within the interior of spout 1070. In such an implementation, rotation or changing of cam 1372 changes the interior shape of 1070 to alter the shape and direction of the stream exiting spout 1070. In such an implementation, the outer walls of spout 1070 may be flexible, but may also be rigid.

Controller 284 comprises a processing unit that controls actuator 1376 based at least in part upon signals from sensor 666 to control the discharge of grain and the filling of the grain carrier. It should further be appreciated that spout directional control system 1354 may be incorporated into system 220 described above, wherein controller 284 may additionally control spout directional control system 1354 based upon other data such as data received from sensors 268, 270, 272, 274, 276 and/or input 278.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. An apparatus comprising: a grain tank to contain grain; a harvester grain unloading auger to discharge the grain from the grain tank, the harvester grain unloading auger having auger flights within an unloader housing; a discharge speed adjustment mechanism coupled to the unloader housing to receive grain from the grain unloading auger at a first speed, wherein the discharge speed adjustment mechanism discharges the grain at a second speed greater than the first speed.

2. The apparatus of claim 1, wherein the grain tank is part of a harvester and wherein the discharge speed adjustment mechanism comprises a fixed speed grain propulsion mechanism to propel grain away from the harvester at the second speed greater than the first speed to locations external to the harvester.

3. The apparatus of claim 1, wherein the grain tank is part of a harvester and wherein the discharge speed adjustment mechanism comprises a variable speed grain propulsion mechanism to propel grain away from the harvester at varying speeds to locations external to the harvester.

4. The apparatus of claim 1, wherein the speed adjustment mechanism comprises a variable speed rotating paddle to propel grain at varying speeds.

5. The apparatus of claim 1, wherein the discharge speed adjustment mechanism comprises a belt to be rotatably driven about multiple axes.

6. The apparatus of claim 1, wherein the discharge speed adjustment mechanism comprises a series of paddles circumferentially spaced about a single axis to be rotatably driven about the single axis.

7. The apparatus of claim 1 further comprising a spout coupled to the unloader housing, wherein the spout comprises shape changeable sidewalls and wherein the discharge speed adjustment mechanism comprises at least one cam to act upon a surface of the shape changeable sidewalls to adjust a cross-section area of the throat of the spout.

8. The apparatus of claim 1 further comprising: a spout coupled to the unloader housing; a movable member within the spout, wherein the movable member is movable within the spout to adjust an internal shape of the spout.

9. The apparatus of claim 1 further comprising: a sensor to sense a grain pile being formed by grain discharged by the discharge speed adjustment mechanism; and a controller to adjust a value of the second speed based upon the sensed grain pile.

10. The apparatus of claim 1 further comprising: a spout coupled to the unloader housing; a sensor to sense a positioning of a grain carrier relative to the spout; and a controller to adjust a value of the second speed based upon the sensed positioning of the grain carrier relative to the spout.

11. The apparatus of claim 1 further comprising: a sensor to sense a rate at which grain is supplied to the speed adjustment mechanism; and a controller to adjust a value of the second speed based upon the sensed rate at which grain is supplied to the speed adjustment mechanism.

12. The apparatus of claim 1 further comprising: a spout coupled to the grain unloader housing and having a discharge opening; a first sensor to sense a grain pile being formed by grain discharged through the discharge opening; a second sensor to sense a positioning of a grain carrier relative to the spout; and a controller to adjust a value of the second speed based upon the sensed grain pile being formed by the grain discharged through the discharge opening and positioning of the grain carrier relative to the spout.

13. The apparatus of claim 1 further comprising: a spout coupled to the grain unloader housing and having a discharge opening; a first sensor to sense a grain pile being formed by grain discharged through the discharge opening; a second sensor to sense a positioning of a grain carrier relative to the spout; a third sensor to sense a rate at which grain is supplied to the spout; and a controller in communication with the first sensor, the second sensor and the third sensor, the controller to adjust a value of the second speed based upon the sensed grain pile being formed by the grain discharged through the discharge opening, the positioning of the grain carrier relative to the spout and the rate at which grain is supplied to the spout.

14. The apparatus of claim 1 further comprising a controller to receive signals indicating a characteristic of the grain to be discharged at a speed controlled by the speed adjustment mechanism, wherein the controller is to activate the speed adjustment mechanism between different grain discharge velocities based upon the characteristic of the grain to be discharged, wherein the characteristic of the grain is selected from a group of characteristics consisting of: grain type, grain mass and grain moisture.

15. The apparatus of claim 1 further comprising: a spout coupled to the grain unloader housing and having a discharge opening; a sensor to sense an orientation of at least one of the spout and a grain tank to receive grain discharged from the spout; and a controller in communication with the sensor to adjust a value of the second speed based upon the sensed orientation of at least one of the spout and the grain tank.

16. The apparatus of claim 1 further comprising: a spout coupled to the grain unloader housing and having a discharge opening; a first sensor to sense a grain pile being formed by grain discharged through the discharge opening; a second sensor to sense a positioning of a grain carrier relative to the spout; a third sensor to sense a rate at which grain is supplied to the spout; a controller in communication with the first sensor, the second sensor and the third sensor, the controller to adjust a value of the second speed based upon the sensed grain pile being formed by the grain discharged through the discharge opening, the positioning of the grain carrier relative to the spout, the rate at which grain is supplied to the spout and at least one characteristic of the grain.

17. The apparatus of claim 1 further comprising: a spout coupled to the grain unloader housing and having a discharge opening; a first sensor to sense a grain pile being formed by grain discharged through the discharge opening; a second sensor to sense a positioning of a grain carrier relative to the spout; a third sensor to sense a rate at which grain is supplied to the spout; a fourth sensor to sense an orientation of at least one of the spout and the grain carrier; a controller in communication with the first sensor, the second sensor, the third sensor and the fourth sensor, the controller to adjust a value of the second speed based upon the sensed grain pile being formed by the grain discharged through the discharge opening, the positioning of the grain carrier relative to the spout, the rate at which grain is supplied to the spout, an orientation of at least one of the spout and the grain carrier and at least one characteristic of the grain.

18. An apparatus comprising:
  a threshing mechanism to separate out grain;
  a grain unloading tube having auger flights to deliver grain from the threshing mechanism; and
  a spout to receive grain from the grain unloading tube and having an opening through which grain is discharged;
  a spout adjustment mechanism to adjust a shape of the opening; and
  a discharge speed adjustment mechanism coupled to the grain unloading tube to receive grain from the auger flights at a first speed, wherein the discharge speed adjustment mechanism discharges the grain through the spout at a second speed greater than the first speed.

19. The apparatus of claim 1, further comprising a variable speed rotating paddle to receive grain from the auger flights and to propel grain away from the harvester at varying speeds to locations external to the harvester.

20. An apparatus comprising: a harvester grain unloading auger having auger flights within an unloader housing; a discharge speed adjustment mechanism coupled to the unloader housing to receive grain from the grain unloading auger at a first speed, wherein the discharge speed adjustment mechanism discharges the grain at a second speed greater than the first speed; a spout coupled to the unloader housing; a sensor to sense a positioning of a grain carrier relative to the spout; and a controller to adjust a value of the second speed based upon the sensed positioning of the grain carrier relative to the spout.

* * * * *